United States Patent
Lindheimer et al.

(10) Patent No.: US 11,212,744 B2
(45) Date of Patent: Dec. 28, 2021

(54) CELL SELECTION RESELECTION AND CAMPING

(71) Applicant: TELEFONAKTIEBOLAGET LM ERICSSON (PUBL), Stockholm (SE)

(72) Inventors: Christofer Lindheimer, Vadstena (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 16/622,593

(22) PCT Filed: Jun. 13, 2018

(86) PCT No.: PCT/IB2018/054340
§ 371 (c)(1),
(2) Date: Dec. 13, 2019

(87) PCT Pub. No.: WO2018/229694
PCT Pub. Date: Dec. 20, 2018

(65) Prior Publication Data
US 2021/0153114 A1   May 20, 2021

Related U.S. Application Data

(60) Provisional application No. 62/520,910, filed on Jun. 16, 2017.

(51) Int. Cl.
*H04W 48/20* (2009.01)
*H04W 48/02* (2009.01)
(Continued)

(52) U.S. Cl.
CPC .......... *H04W 48/20* (2013.01); *H04W 48/02* (2013.01); *H04W 48/10* (2013.01)

(58) Field of Classification Search
None
See application file for complete search history.

(56) References Cited

U.S. PATENT DOCUMENTS

2012/0083204 A1* 4/2012 Martin .................... H04W 4/70
  455/26.1
2016/0353371 A1* 12/2016 Zhang ................... H04W 48/10
(Continued)

FOREIGN PATENT DOCUMENTS

EP   2953404 A1   12/2015

OTHER PUBLICATIONS

3GPP TS 36.304 V14.2.0: 3rd Generation Partnership Project; Technical Specification Group Radio Access Network Evolved Universal Terrestrial Radio Access (E-UTRA); User Equipment (UE) procedures in idle mode (Release 14); Mar. 2017; 49 pages.
(Continued)

*Primary Examiner* — Hong S Cho
(74) *Attorney, Agent, or Firm* — Ericsson Inc.

(57) ABSTRACT

Systems and methods for cell selection, reselection and camping are provided. A network node transmits cell broadcast information including a cell reservation indication and a cell reservation exception indication. A wireless device receives cell broadcast information and determines if the cell is reserved for selection. The cell can be selected, and camped on, in accordance with the wireless device being associated with the cell reservation exception indication.

32 Claims, 9 Drawing Sheets

640. Receive cell broadcast information including cell reservation indication

650. Determine cell broadcast information includes cell reservation exception indication 660. Select cell in accordance with cell reservation exception indication

(51) Int. Cl.
    *H04W 48/10*     (2009.01)
    *H04W 48/12*     (2009.01)

(56) References Cited

U.S. PATENT DOCUMENTS

2017/0127326 A1*   5/2017   Rubin .................... H04B 17/00
2017/0164250 A1*   6/2017   Kim ...................... H04W 88/02

OTHER PUBLICATIONS

3GPP TSG-RAN WG2, Meeting No. 98: "System information structure and contents": May 15-19, 2017; 9 pages.
3GPP TSG-RAN WG3, No. 96: "Some Considerations on CSG": May 15-19, 2017; 2 pages.
3GPP TSG-SA WG1, Meeting No. 78: "Discussion of Closed Subscriber Group (CSG) in 5G": May 8-12, 2017; 1 page.
3GPP TSG RAN, Meeting No. 76: Discussion of Closed Subscriber Group (CSG) in NR; Jun. 5-8, 2017; 3 pages.
3GPP TS 36.331 V14.2.2 (Apr. 2017): "3rd Generation Partnership Project; Technical Specification Group Radio Access Network; Evolved Universal Terrestrial Radio Access (E-UTRA); Radio Resource Control (RRC); Protocol specification (Release 14)". 36.331—Link: http://www.3gpp.org/ftp//Specs/archive/36_series/36.331/36331-e22.zip.

* cited by examiner

CELL SELECTION RESELECTION AND CAMPING

CROSS REFERENCE TO RELATED APPLICATIONS

This application claims the benefit of U.S. Provisional Application No. 62/520,910 filed on Jun. 16, 2017, the entire contents of which are hereby incorporated by reference.

TECHNICAL FIELD

The present disclosure generally relates to wireless communications and wireless communication networks.

INTRODUCTION

The architecture for New Radio (NR) (also known as 5G or Next Generation) is being discussed in standardization bodies such as 3GPP. FIG. 1 illustrates an example of a wireless network 100 that can be used for wireless communications. Wireless network 100 includes UEs 102A-102B and a plurality of network nodes, such as radio access nodes 104A-104B (e.g. eNBs, gNBs, etc.) connected to one or more network nodes 106 via an interconnecting network 115. The network 100 can use any suitable deployment scenarios. UEs 102 within coverage area 108 can each be capable of communicating directly with radio access node 104A over a wireless interface. In some embodiments, UEs 102 can also be capable of communicating with each other via D2D communication.

As an example, UE 102A can communicate with radio access node 104A over a wireless interface. That is, UE 102A can transmit wireless signals to and/or receive wireless signals from radio access node 104A. The wireless signals can contain voice traffic, data traffic, control signals, and/or any other suitable information. In some embodiments, an area of wireless signal coverage associated with a radio access node 104A can be referred to as a cell 108. 108 is the serving cell and 110 is another neighboring cell that also may allow for communication, but to which the UE 102A is not currently connected.

The interconnecting network 115 can refer to any interconnecting system capable of transmitting audio, video, signals, data, messages, etc., or any combination of the preceding. The interconnecting network 115 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 106 can be a core network node 106, managing the establishment of communication sessions and other various other functionalities for UEs 102. Examples of core network node 106 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 102 can exchange certain signals with the core network node using the non-access stratum layer. In non-access stratum signaling, signals between UEs 102 and the core network node 106 can be transparently passed through the radio access network. In some embodiments, radio access nodes 104 can interface with one or more network nodes over an internode interface.

When obtaining access to a wireless communication system, a UE 102 must signal to the network that it wants to acquire communication opportunities. There are many schemes for how this can be accomplished. For example, UE 102 can utilize air-interface resources (e.g., times, frequencies) to send a short message that would indicate to the network that a UE 102 wants to communicate. Further details about specific communication need(s) can then occur in subsequent communication(s).

An event which triggers the UE 102 to perform a request to access a wireless communication system may be, for example, a need for an application, such as a software module in the UE 102, to transmit uplink user data and/or receive downlink user data. Another example is a need to exchange signaling messages with a network node 106. Or alternatively, a combination of both.

Considering the simplified wireless network 100 illustrated in FIG. 1, a UE 102A communicates with an access node 104A which in turn is connected to a network node 106. 108 is the serving cell and 110 is another neighboring cell that also may allow for communication, but to which the UE 102A is not currently connected. The access node 104A can correspond to an Evolved NodeB (eNB) and the network node 106 can correspond typically to either a Mobility Management Entity (MME) and/or a Serving Gateway (SGW).

In 3GPP LTE systems, a request for communication is performed by initiating a random-access procedure followed by an RRC Connection Establishment procedure, an example of which is illustrated in FIG. 2. This sequence starts with a transmission of a Random Access Preamble (201), also referred to as "msg1", on specifically allocated channels or resources. This Random Access Preamble is, when received by a base station or eNB, followed by a Random Access Response (202), also referred to as "msg2", that includes an allocation of resources for continued signaling, in this case the RRC Connection Request (203), also referred to as "msg3" which is the first message in the RRC Connection Establishment procedure.

It will be appreciated that an access attempt will cost air interface resources. Both the initial message (Preamble 201) as well as resources for further signaling (messages 202-205) will add to the wireless network load, simply to configure and setup communication resources for subsequent data transfer. It should be noted that even further communication is typically needed with network entities before any communication can take place, and these are not included in FIG. 2.

Under certain circumstances, it may be desirable to prevent one or more UE(s) from making these access attempts. For example, in case of an overload situation like radio resource congestion or shortage of processing capabilities, a network may wish to reduce overload by denying access to a cell. The network may also need to prioritize between specific users and/or services during overload situations. For example, to give priority to emergency calls compared to ordinary calls.

To this end, the network can employ what is referred to as "access control". Access Class Barring (ACB) is an example of one such control. In short, access barring is about preventing or making it less likely that a UE will attempt to send an access request (e.g. to initiate the sequence in FIG. 2 by sending a Preamble message 201). In this way, the total load in the system can be controlled. The network may, for example, divide UEs or different reasons for why a UE want access into different classes or categories and, dependent on this, the network can differentiate and make it less likely that certain UEs and/or certain events trigger access requests. For example, a given UE may belong to a certain access class and the network may communicate, via broadcasted system information, that certain classes at certain instances are barred (e.g. not allowed to make access or allowed to make access with a lower probability if not barred altogether). When a UE receives this broadcasted system information, if it belongs to a barred access class, it may result in the UE not sending an access request. There are many variants of access barring mechanisms specified for LTE and other networks.

Another approach for avoiding traffic from UEs that may not be allowed to communicate in a cell is to indicate, already in a cell selection procedure, that the cell is not available for normal use for a particular UE(s).

PLMN (Public Land Mobile Network) selection, cell selection and re-selection are described in 3GPP TS 36.304.

When a UE is switched on, a PLMN is selected. This may be performed, for example, based on instructions stored on the SIM, in accordance with PLMN(s) configured/allowed for selection by the Home PLMN (e.g. the operator). This can be performed in a logical part (layer) of the UE that is referred to as Non-Access Stratum (NAS).

FIG. 3 illustrates a division of the 3GPP system into domains and strata. The domains include the User Equipment (UE) 102, the Access Network (AN) 302 and the Core Network (CN) 303. The UE 102, AN 302 and CN 303 typically contain both a user plane for data and also control signaling to higher layers and a control plane for managing connections and functions.

The User Equipment (UE) 102 is a device allowing a user access to network services. It is typically a wireless terminal, such as a smartphone, equipped with a User Services Identity Module (USIM). The latter contains the credentials in order to unambiguously and securely identify itself. The functions of the USIM may be embedded in a standalone smart card, but could also be realized, for example, as software in a software module.

The Access Network (AN) 302 (also known as the Radio Access Network, RAN) contains access nodes, or base stations, such as eNBs/gNBs 104, which manage the radio resources of the access network and provide the UE 102 with a mechanism to access the core network 303. The Access Network 302 is dependent of the radio access technology used in the wireless interface between the UE 102 and Access Network 302. Thus, there are different flavours of access networks 302 for different radio access technologies, such as E-UTRAN supporting LTE or E-UTRA radio access technology and NG-RAN supporting New Radio (or 5G) type of radio access technology.

The Core Network (CN) 303 consists of network nodes, such node 106, which provide support for the network features and telecommunication services, such as the management of user location information, control of network features and services, the switching and transmission of signaling and user data. The core network 303 also provides the interface towards the External Network 307. There are different types of core networks 303, for different 3GPP system generations. For example, in 4G, also known as the Evolved Packet System (EPS), includes the Evolved Packet Core (EPC). Developed as part of the 5G System (5GS), there is the 5G Core (5GC).

Moreover, the core network 303 is access-agnostic and the interface between the access network 302 and core network 303 enables integration of different 3GPP and non-3GPP access types. For example, an Access Network 302 (also known as E-UTRAN) supporting LTE or E-UTRA radio access technology as well as an access network (also known as NG-RAN) supporting New Radio type of radio access technology can both be connected to a 5G type of core network 303 (also known as 5GC).

The External Network 307 represents here a network outside of the 3GPP domain, such as the public Internet.

As illustrated in FIG. 3, the 3GPP system is also horizontally divided into the access Stratum (AS) 304 and Non-Access Stratum (NAS) 305 reflecting a protocol layering hierarchy. In the AS 304 we find functions which are related to the wireless portion of the system such as transport of data over the wireless connection and managing radio resources. The AS 304 typically includes functions in the access network 302 and the dialogue (using corresponding protocols) between the UE 102 and the access network 302. The NAS 305, which can be seen as higher in the protocol layering hierarchy than AS 304, includes functions which are not directly dependent on the radio access technology and typically the functions in the core network and the dialogue (using corresponding protocols) between the UE 102 and the core network 303.

FIG. 4 illustrates an example of the protocol layers in user plane 401 and control plane 402 of a 3GPP system. In FIGS. 3 and 4, it is noted that the Application Layer 306 is illustrated above NAS 305. The Application Layer 306 can contain parts in the UE 102, the core network 303 and the External network 307.

Returning now to PLMN selection, for the Selected PLMN (selected by NAS 305), associated radio access technologies may be configured. It is not necessarily the case that a PLMN operate all or certain specific access technologies. The AS 304 shall then, for the selected PLMN perform a cell selection. In cell selection, the UE 102 searches for a suitable cell of the selected PLMN and chooses that cell to provide available services. Further the UE 102 shall tune to its control channel. This choosing is known as "camping on the cell". The UE 102 shall, if necessary, register its presence, by means of a NAS 305 registration procedure. If the UE 102 finds a more suitable cell, according to certain cell reselection criteria, it reselects onto that cell and camps on it. If the new cell does not belong to the same area as the previous cell, known as tracking area, the cell need to update the network with what area it is located in. If necessary, the UE 102 shall search for higher priority PLMNs at regular time intervals and search for a suitable cell if another PLMN has been selected by NAS 305.

The purpose of camping on a cell in idle mode is to, among other things, enable the UE 102 to receive system information and establish an RRC connection. Further, if the PLMN receives a call for a registered UE 102, the network would know where (e.g. in what tracking area) the UE 102 is camping, and the network can then send a paging message in that particular area. The UE 102 will then receive the paging message as it is listening to the control channels in the cell.

If the UE 102 is unable to find a suitable cell to camp on or if the location registration failed, it will attempt to camp on a cell irrespective of the PLMN identity, and can enter a "limited service" state. Three different states are described in 3GPP TS 36.304: Limited Service, Normal Service and Operator Service.

The cells in a network can also be categorized according to which services they offer, for example, as an acceptable cell or as a suitable cell. An "acceptable cell" is a cell on which the UE 102 may camp to obtain limited service (e.g. originate emergency calls). This cell shall not be barred. A "suitable cell" is a cell on which the UE 102 may camp on to obtain normal service. The UE 102 shall have a valid USIM and such a cell shall fulfil all the following requirements. This cell shall be part of the selected PLMN, the registered PLMN or an "Equivalent PLMN".

In some scenarios, there can be more than one PLMN identity broadcast in the cell, i.e., it can be a cell supporting traffic for two PLMNs.

As stated above, in the PLMN and cell selection, cells can also be barred or reserved. A barred cell is a cell that a UE is not allowed to camp on. A reserved cell is a cell on which camping is not allowed, except for particular UEs as indicated in the system information. In the system information, there is an indication cellReservedForOperatorUse that relates to reserving a cell.

With the above-introduced terminology, a UE will generally look for a suitable cell that is not barred/reserved once a PLMN is selected, such that it can enter a normal service mode. It may be useful to provide a mechanism to allow for future introduction of features to indicate that cells are restricted or reserved for particular UEs in a cell selection procedure.

SUMMARY

It is an object of the present disclosure to obviate or mitigate at least one disadvantage of the prior art.

In some aspects of the present disclosure, there is provided systems and methods for cell selection, reselection and camping.

In a first aspect, there is provided a method for cell selection performed by a wireless device. The method includes receiving broadcast information associated with a cell including a cell reservation indication. Responsive to determining that the cell is reserved in accordance with the cell reservation indication, it is determined that the broadcast information further includes a cell reservation exception indication. The cell is selected in accordance with determining that the cell reservation exception indication is associated with the wireless device.

In another aspect, there is provided a wireless device comprising circuitry including a processor and a memory. The memory contains instructions executable by the processor whereby the wireless device is operative to receive broadcast information associated with a cell including a cell reservation indication. Responsive to determining that the cell is reserved in accordance with the cell reservation indication, the wireless device determines that the broadcast information further includes a cell reservation exception indication. The wireless device selects the cell in accordance with determining that the cell reservation exception indication is associated with the wireless device.

In some embodiments, the cell reservation indication can indicate that the cell is barred for selection by wireless devices. In some embodiments, the cell reservation indication can indicate that the cell is reserved for at least one of operator use and other use.

In some embodiments, the cell reservation indication can further indicate that the broadcast information includes at least one cell reservation exception indication.

In some embodiments, the cell reservation exception indication can define at least one exception for which the cell is not barred for selection by wireless devices.

In some embodiments, the cell reservation exception indication defines an available service level for the cell. The cell can be selected in accordance with the available service level.

In some embodiments, the cell reservation exception indication can define at least one wireless device identity that is allowed to select the cell. In some embodiments, the cell reservation exception indication defines at least one closed subscribed group (CSG) that is allowed to select the cell.

In some embodiments, the cell reservation exception indication identifies a network slice. The identified network slice can be accessed by the wireless device.

In another aspect, there is provided a method for cell reservation performed by a network node. The method can include setting a value of a cell reservation indication to indicate that a cell is barred for selection. Responsive to determining an exception to the cell reservation, a value of a cell reservation exception indication is set to define at least one exception for which the cell is not barred for selection. Broadcast information associated with the cell is transmitted, the broadcast information including the cell reservation indication and the cell reservation exception indication.

In another aspect, there is provided a network node comprising circuitry including a processor and a memory. The memory contains instructions executable by the processor whereby the network node is operative to set a value of a cell reservation indication to indicate that a cell is barred for selection. Responsive to determining an exception to the cell reservation, the network node sets a value of a cell reservation exception indication to define at least one exception for which the cell is not barred for selection. The network node transmits broadcast information associated with the cell, the broadcast information including the cell reservation indication and the cell reservation exception indication.

In some embodiments, the cell reservation indication can indicate that the cell is reserved for at least one of operator use and other use.

In some embodiments, the cell reservation exception indication can define at least one wireless device identity that is allowed to select the cell. In some embodiments, the cell reservation exception indication can define at least one closed subscribed group (CSG) that is allowed to select the cell.

In some embodiments, the cell reservation exception indication can indicate an available service level for the cell.

In some embodiments, the cell reservation exception indication can identify a network slice available for selection.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
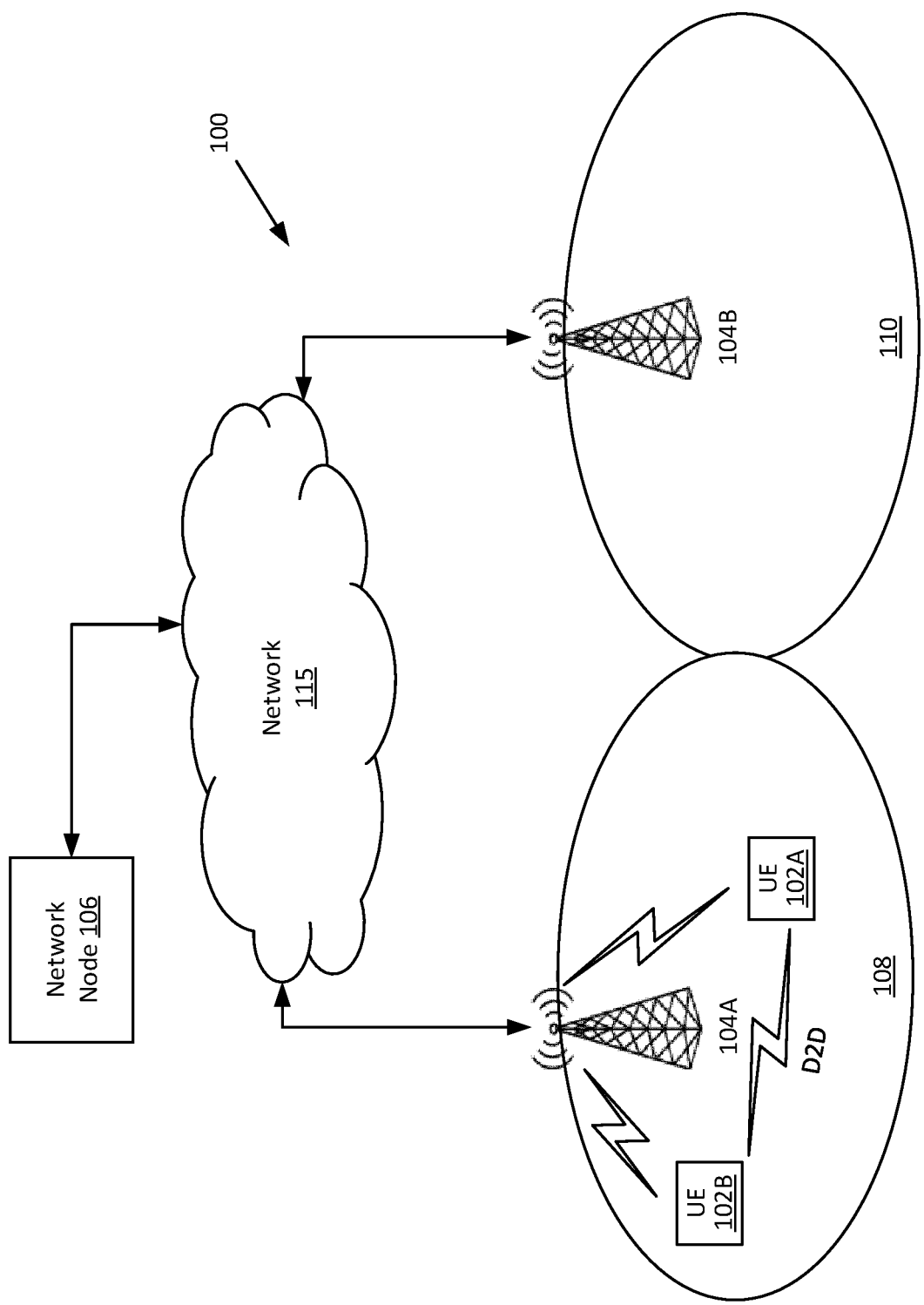
FIG. 1 illustrates an example wireless network.
Figure 2:
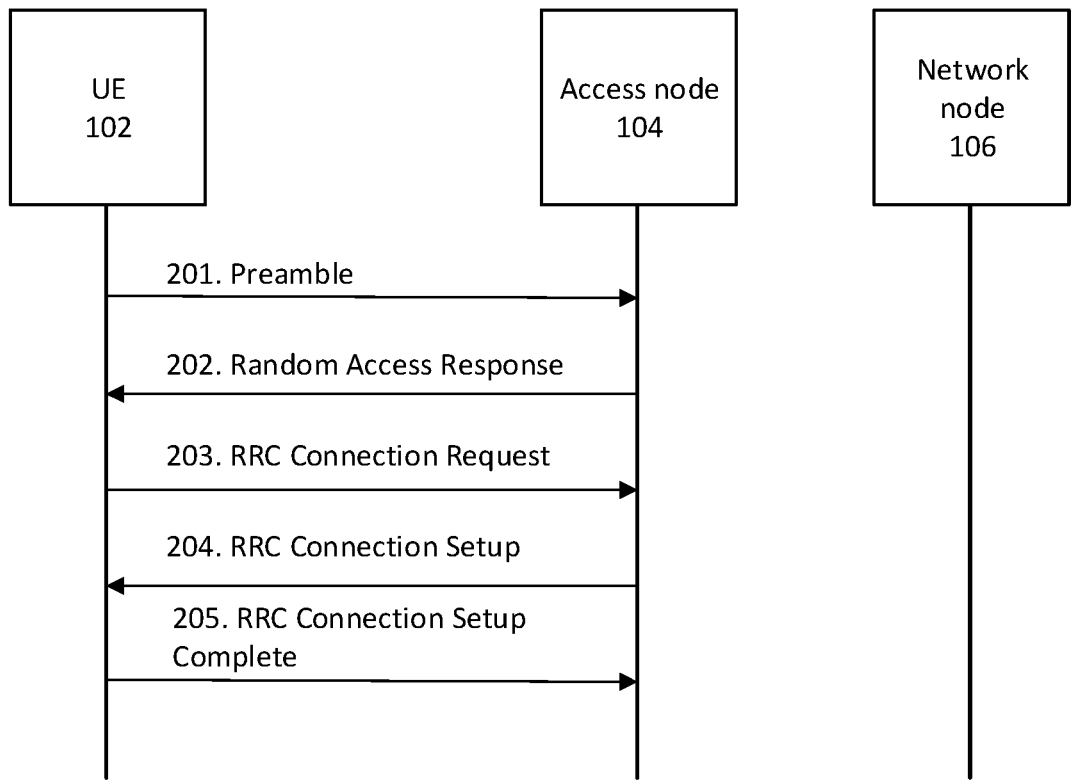
FIG. 2 illustrates an example random access procedure.
Figure 3:
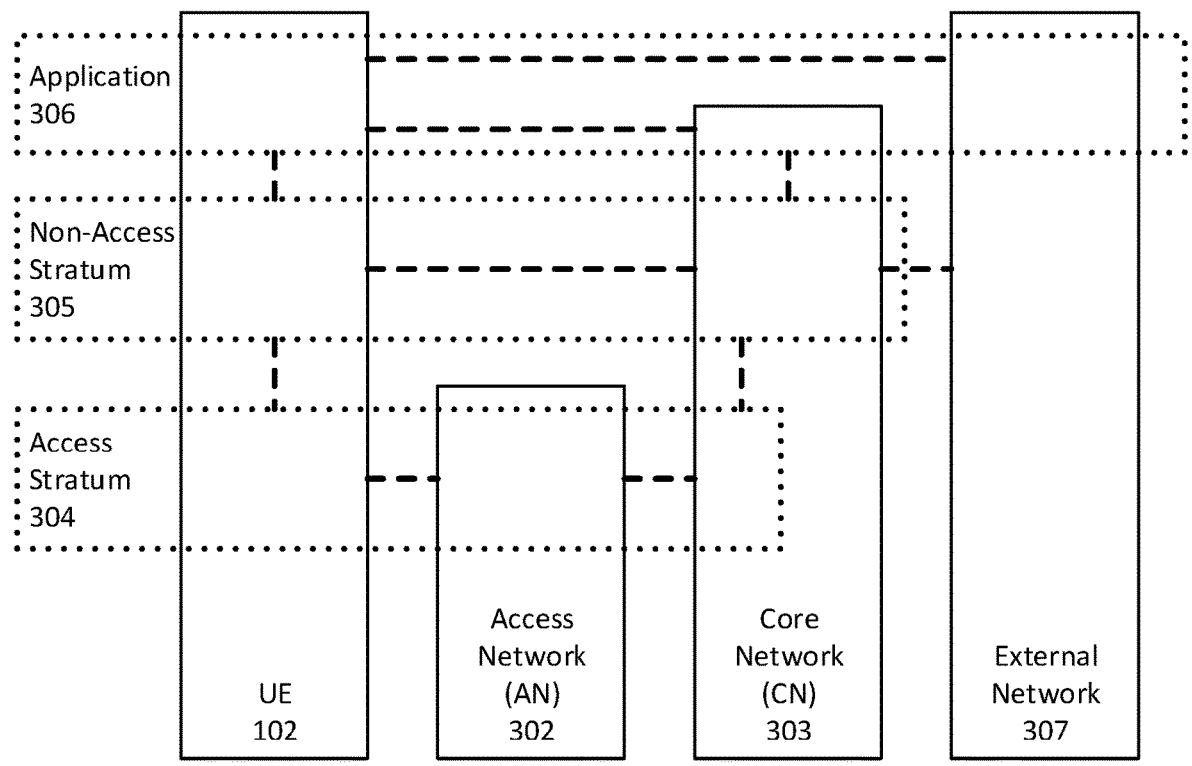
FIG. 3 illustrates an example of domains and strata in a 3GPP system.
Figure 4:
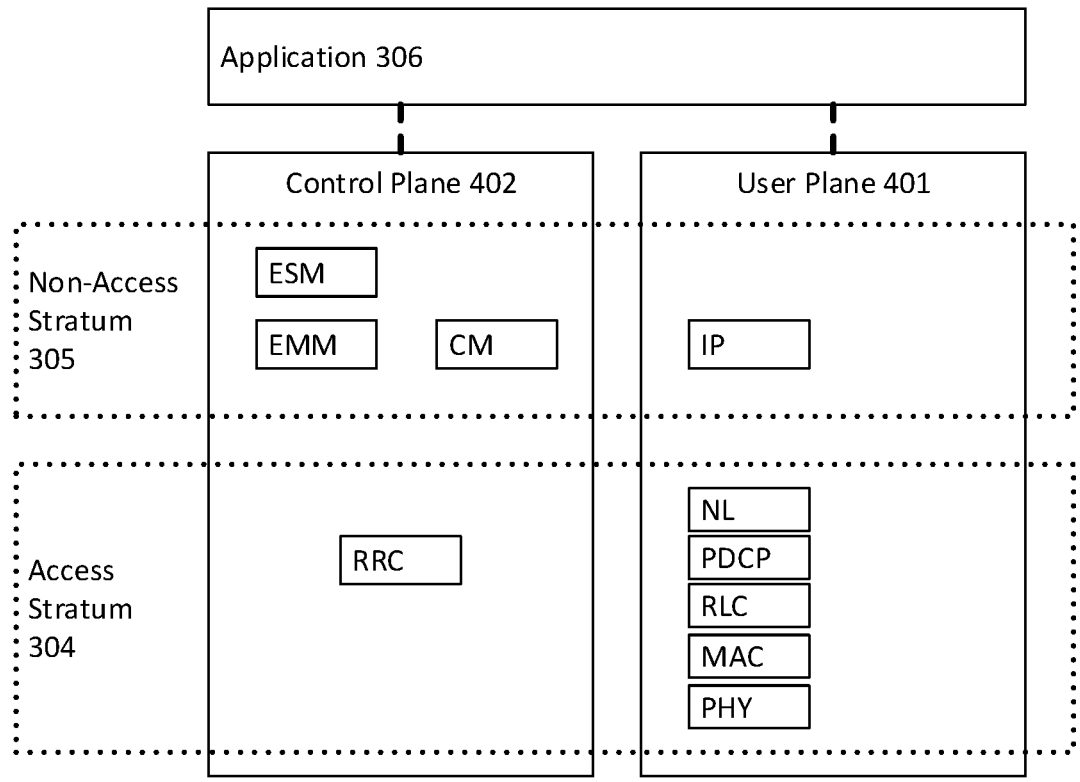
FIG. 4 illustrates an example of protocol layers in a 3GPP system.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 7.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 9.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a UE or a network node.

In some embodiments, a UE can be configured to operate in carrier aggregation (CA) implying aggregation of two or more carriers in at least one of DL and UL directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different TPs of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re)selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

As discussed, in PLMN and cell selection, system information can indicate to a UE if a cell is barred or reserved from selection. In some situations, however, it may be desired to restrict selection of a cell for certain UEs only. The example of cellReservedForOperatorUse is one such indication. In addition, there is a feature referred to as "Closed Subscriber Group" (CSG). The CSG functionality allows for configuration of cells that can be selected and camped on by only certain UEs. These UEs then belong to a CSG. Other UEs may be able to select such CSG-cells to enter only a limited service mode, i.e., it would be an acceptable cell or alternatively would not be allowed to camp at all.

Information about CSG-cells can be broadcast in the cell. A CSG-Indication and a CSG-Identity field can be included. The CSG-Indication is either true or false and, if true, a CSG-Identity field can be included to indicating what CSG-Identity is associated with the cell. If a UE is not part of such a CSG-Identity/group, it would not be allowed to select the cell.

Currently, with the specification of NR, it is undecided if the concept of CSGs will be supported. It may be desirable to ensure that UEs compliant with earlier standards are compatible with future releases.

As the CSG-Indication parameter can be used by UEs that both support and those that do not support selecting a CSG-cell for normal camping, it becomes a challenge to introduce such a CSG-indication in later releases of the standard, as that indication will not be interpreted by UEs that are only compliant to earlier releases. It may also be that in the future, there is a need to include other aspects that may, in any way restrict camping or cell selection and it is important that, if such is included, there is a coherent behaviour among all UEs, also those UEs that are compliant to earlier standards.

According to some embodiments of the present disclosure, a reservedNrCell indication can be utilized. This indication can be interpreted by UE(s) that cannot necessarily understand exactly why a NR cell is reserved. In a reservedNrCell, camping in normal mode is not allowed.

In addition to the reservedNrCell indication, some embodiments include adding additional information in a reservedNrCellExceptions indication. The reservedNrCellExceptions indication will include exceptions to the general rule that camping in normal mode is not allowed. Such exceptions can, for example, point towards certain groups of UEs or UEs that aim to associate with certain parts/slices of the network.

According to other embodiments, the new NR standard can include an indication corresponding to "reservedForOperatorUse" as is outlined in, e.g., 3GPP TS 36.304, thus starting to populate the exceptions to the reservedNrCell indication already from the first NR release.

Such a generic indication and descriptor for how cells may be reserved for specific UEs can be used when introducing future features. Accordingly, the behavior of earlier release UEs can be controllable and consistent.

A part of forward compatibility is to ensure that the behaviour of legacy UEs is maintained, even when new features are supported in later releases. Earlier release-UE behaviour should be controllable in a similar way as prior to new introductions.

As previously discussed, a cellular system is specified with cells, access nodes, network nodes and a cell selection procedure. The cellular system can be extended with a functionality that introduces cells (e.g. 108, 110) that are not allowed to be selected by certain UEs. Cell selection procedures can allow for reserving cells for operator use, for barring cells completely, and for assigning a CSG identity to a UE that, if that particular identity is part of a cell broadcast, selection of that cell may be allowed. It should be possible to keep all other UEs away from selecting that cell.

In the future, however, it is not necessarily the case that CSG-cells will be introduced and restrictions for access to a cell may be associated with other aspects, such as what network portion a UE can access. Sometimes a network may provide for configuration of more or less isolated logical network parts, also referred to as "slices". For example, an enterprise may be offered by a PLMN operator to lease resources (spectrum, processing) but possibly manage parts, or all, of these resources and also control how they will be used and by whom. In such situations, it may, instead of a closed subscriber group in a PLMN be other differentiators that are used, such as slice IDs and it may be possible to block UEs that aim to register to such slices (but not others).

If such a feature is included in a future release of a cellular standard, it is important that this introduction can be made in such a way as to not impact the behaviour and possibility to control how earlier release UEs will behave, in particular with respect to cell selection. For example, if introduced in a future release, UEs supporting CSG shall be able to select a cell that shall not be possible to select for UEs not supporting CSG. Similarly, if UEs aim to register to a certain network portion/slice of a network, it may be important to signal that, for example, certain cells can only support selection if the UE can connect and register with a certain slice, and that they are otherwise reserved for all other UEs.

Thus, according to some embodiments, it is proposed to include, as broadcast information, a cell reservation indicator (reservedNrCell). The cell reservation indicator can be introduced such that all UEs pursuant to the standard can understand and interpret the indicator.

In some embodiments, the cell reservation indicator can be provided in system information per supported PLMN or it can be supported per cell in case the same geographical cell has different cell identifiers per PLMN.

In some embodiments, the cell reservation indicator can indicate to all UEs that the cell in which it is broadcast, or otherwise is associated with (e.g. connected to a Cell ID in signaling), is reserved and not available for cell selection and camping in normal service mode.

In some embodiments, if the cell reservation indicator is set to "true", or otherwise indicates that the cell is reserved (dependent on if the indicator is, e.g., of type Boolean or other), a UE may still be able to select and camp on that cell and whether this is possible can depend on another indication, such as a cell reservation exception indication (reservedNrCellExceptions) information element.

Thus, assuming that the cell reservation indicator is Boolean, if reservedNrCell is set to TRUE, a UE can then read the cell reservation exception indication parameter. If reservedNrCell is set to FALSE, the cell is not reserved.

In the cell reservation exception indication information element, it can be further possible to specify exceptions for which the cell is not reserved. It can further be possible to specify, for example, what type of reservation it is, if it is possible to camp in limited service state, if emergency calls may be initiated, and/or other aspects.

In its simplest form, the cell reservation exception indication parameter can, for example, only be indicating that a cell is reserved for operator use. Conventional networks do not allow for specifying if a reserved cell can be selected for limited service mode. Such information can be included in a cell reservation exception indication in some embodiments.

According to other embodiments, a UE that reads the cell reservation exception indication shall follow the instructions given therein and only select the cell if it is so allowed, based on the indicated exceptions.

In some embodiments, the cell reservation exception indication can be extended with additional rules as required. It is noted that rules added in future releases can, according to some embodiments, make it possible to select a cell that is otherwise reserved and to selectively identify UEs that are not allowed to select a cell.

Dependent on if it is important to keep selected UEs away from a cell, or to allow selected UEs to select a cell, the rules in the cell reservation exception indication can be constructed such that they are either allowing or preventing, or there could be a mix of such rules.

As an example, reservedNrCellExceptions can indicate: not reserved for UEs that aim to attach to communicate using network portion/Slice ID X. Alternatively, resevedNrCellExceptions can indicate: Cell is reserved for all UEs except UEs that aim to attach to communicate using network portion/Slice ID X. The former would allow Slice ID X usage whereas the latter would allow all other usage but Slice ID X.

If at some point in time, a CSG functionality is introduced (e.g. CSG as supported by LTE/E-UTRAN), the reservedNrCellExceptions information element can be extended to include the CSG-Identity information element indicating one or more CSG identities that may be allowed to select and camp on the cell. In some embodiments, the service level may also be different and configurable. For example, reservedNrCellExceptions can indicate:

not reserved for CSG-Identity-1—Limited Service mode
not reserved for CSG-Identity 2—Normal Service mode The following is an example of how such rules can be coded as ASN.1 in the information broadcast.

```
SystemInformationBlockType1 ::=     SEQUENCE {
    cellAccessRelatedInfo           SEQUENCE {
        plmn-IdentityList               PLMN-IdentityList,
        trackingAreaCode                TrackingAreaCode,
        cellIdentity                    CellIdentity,
        cellBarred                      ENUMERATED {barred, notBarred},
        intraFreqReselection            ENUMERATED {allowed, notAllowed},
        reservedNrCell                  BOOLEAN,
        reservedNrCellExceptions        ReservedNrCellExceptions OPTIONAL  --
Need OR
    },
    <other information elements>
}
ReservedNrCellExceptions ::=        SEQUENCE {
    cellReservedForOperatorUse      BOOLEAN,
    futureExtensios                 SEQUENCE { }   OPTIONAL
}
```

In this example, the SystemInformationBlockType1 contains the reservedNrCell indicator as a BOOLEAN value. In case it is set to TRUE, a UE will read the reservedNrCellExceptions information element. In some embodiments, it can include in this example an indication whether the cell is reserved for operator use, and an optional "futureExtensions" information element, which may be empty in a current release but used as a placeholder when extending the information element in future releases.

The example below illustrates an extension of the definition of ReservedCellNrExceptions in a future release.

```
ReservedNrCellExceptions ::=            SEQUENCE {
    cellReservedForOperatorUse          BOOLEAN,
    reservedNrCellExceptions-r16        SEQUENCE {
        csg-Indication                      BOOLEAN,
        csg-Identity                        CSG-Identity   OPTIONAL, -- Need OR
        futureExtensions                    SEQUENCE { }   OPTIONAL
    }
}
```

In this release, the "futureExtensions" empty extension placeholder in the earlier release can be replaced by an example extension reservedNrCellExceptions-r16, which includes information for indicating that the cell is to be used for a certain CSG identified with the CSG-Identity. To make room for future extensions, it can includes an optional futureExtensions empty extension placeholder as well.

It will be appreciated that the same principle can be also used to extend the reservedNrCellExceptions information element in yet another later future release, and so on.

An alternative approach is to use extensions at the message level. In this approach, the futureExtensions empty extension placeholder, rather as part of the reservedNr-CellExceptions, can instead be put at the end of the message definition of systemInformationBlockType1. When an extension is made in a future release of anything in this message, all extensions are included together in the future-Extensions placeholder.

Figure 5:
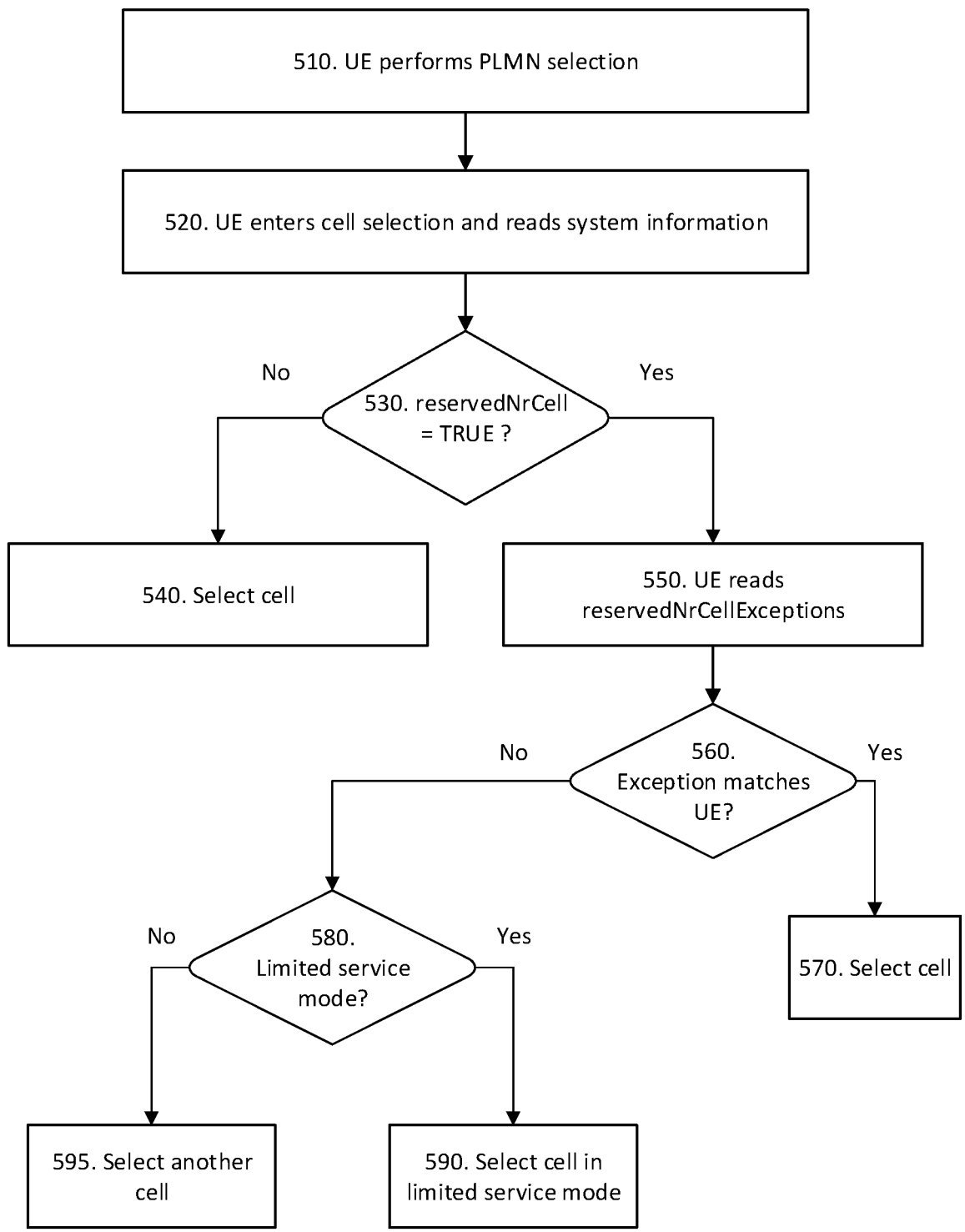
FIG. 5 is a flow chart illustrating a method for cell selection.

FIG. 5 is a flow chart illustrating an example method for cell selection according to some embodiments. The method of FIG. 5 can be performed in a UE, such as UE 102. The method can include:

Step 510: Performing PLMN selection.

Step 520: Entering cell selection and reading system information of the cell.

Step 530: Determining if a reserved NR cell indicator is present.

Step 540: If no, select the cell.

Step 550: If yes, read the reserved NR cell exceptions parameter.

Step 560: Determine if information in the reserved NR cell exceptions matches one of more of the UE parameters, such as type, identity, subscription, purpose, etc.

Step 570: If yes, select the cell.

Step 580: If no, determine if the exception allows for limited service mode.

Step 590: If yes, select cell in limited service mode.

Step 595: If no, select another cell.

In step 510, the UE performs a PLMN selection to find a suitable cell that it can select and camp on. In this procedure, it can include a set of measurements on frequencies to find broadcast that are omitted in FIG. 5 for clarity. Once a cell is found, the UE reads the broadcast information (step 520) to determine, among other things, if the cell is barred or reserved. If the reservedNrCell indication is present (step 530) and set to False, the UE may proceed to select the cell (step 540). If the reservedNrCell indication is set to True, the UE proceeds to read the reservedNrCellExceptions information element (step 550). If there are exceptions that match the UE (step 560) and these exceptions are of the type that identify particular UE(s) that are exceptions to the reservation (e.g. the cell is not reserved for such UEs) it may proceed to select the cell (step 570). Alternatively, if the exceptions do not identify the particular UE, and the reservation is still relevant this is set to True, the UE reads the reservedNrCellExceptions to determine if limited service mode is permitted (step 580). The UE can then select the cell in limited service mode (step 590) or select another cell (step 595) accordingly.

It will be appreciated that one or more of the above steps can be performed simultaneously and/or in a different order. Also, steps illustrated in dashed lines are optional and can be omitted in some embodiments.

As discussed, the method of FIG. 5 is one example of how the cell reservation and cell reservation exception indications can be configured by a network and interpreted by a UE in cell selection. The cell reservation and cell reservation exception indications can be used to signal the appropriate selection rules for a particular cell(s).

Figure 6A:
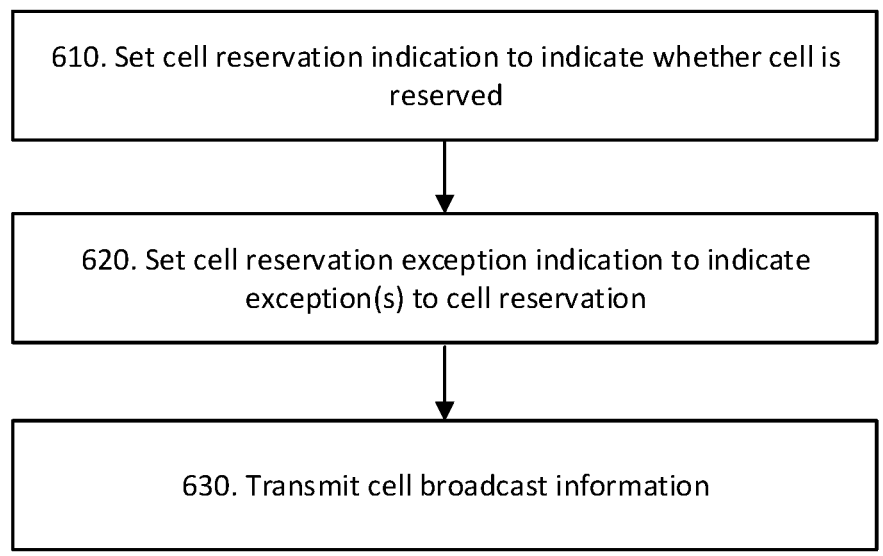
FIG. 6a is a flow chart illustrating a method performed in a network node.

FIG. 6a is a flow chart illustrating a method which can be performed in a network node, such as access node 104. The method can include:

Step 610: Set a value of a cell reservation indication to indicate whether a cell is reserved/barred for selection by wireless devices. In some embodiments, the cell reservation indication can indicate that the cell is reserved for at least one of operator use and other use. In some embodiments, the cell reservation indication can indicate that the cell is not available for cell selection and camping in a normal service mode.

Step 620: Set a value of a cell reservation exceptions indication to indicate at least one exception for which the cell is not reserved/barred for selection. This can be performed responsive to determining that exception(s) to the cell reservation exist. In some embodiments, the cell reservation exception indication can define at least one wireless device identity that is allowed to select the cell. In some embodiments, the cell reservation exception indication can define at least one CSG that is allowed to select the cell. In some embodiments, the cell reservation exception indication can indicate an available service level for the cell. In some embodiments, the cell reservation exception indication can identify a network slice that is available for access.

Step 630: Transmit broadcast information associated with the cell. The broadcast information can include the cell reservation indication and the cell reservation exceptions indication. The broadcast information can be transmitted to one or more wireless devices It will be appreciated that one or more of the above steps can be performed simultaneously and/or in a different order. Also, steps illustrated in dashed lines are optional and can be omitted in some embodiments.

Figure 6B:
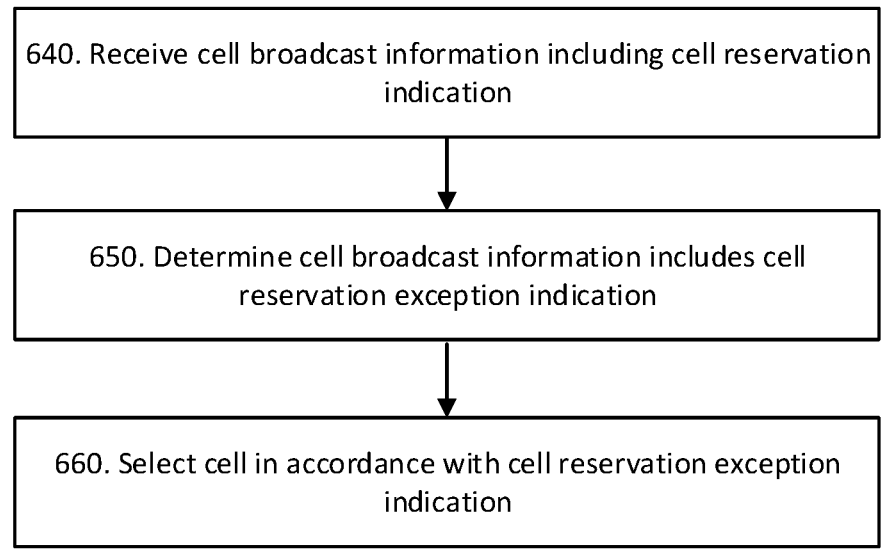
FIG. 6b is a flow chart illustrating a method performed in a wireless device.

FIG. 6b is a flow chart illustrating a method which can be performed in a wireless device, such as UE 102. The method can include:

Step 640: Receive broadcast information associated with a cell. The broadcast information can include a cell reservation indication. The cell reservation indication can indicate that the cell is reserved/barred for selection by wireless devices. The cell reservation indication can indicate that the cell is reserved for operator use and/or other use. In some embodiments, the cell reservation indication can indicate that the broadcast information also includes further information, such as a cell reservation exception indication. In some embodiments, the cell reservation indication can indicate that the cell is not available for cell selection and camping in a normal service mode.

Step 650: Determine that the broadcast information includes a cell reservation exception indication. This determination can be performed responsive to determining that the cell is reserved, in accordance with the cell reservation indication. The cell reservation exception indication can define at least one exception for which the cell is not barred for selection by wireless devices.

In some embodiments, the cell reservation exception indication can indicate an available service level for the cell. In some embodiments, the cell reservation exception indication can define at least one wireless device identity, or type of wireless device, that is allowed to select the cell. In some embodiments, the cell reservation exception indication defines at least one CSG that is allowed to select the cell. In some embodiments, the cell reservation exception indication can identify a network slice available for access.

Step 660: Select the cell in accordance with the cell reservation exception indication. This can include determining that the cell reservation exception indication is associated with, or identifies, the wireless device.

In some embodiments, the cell can be selected in accordance with the indicated available service level. In some embodiments, the wireless device can register with and/or access the identified network slice.

It will be appreciated that one or more of the above steps can be performed simultaneously and/or in a different order. Also, steps illustrated in dashed lines are optional and can be omitted in some embodiments.

Figure 7:
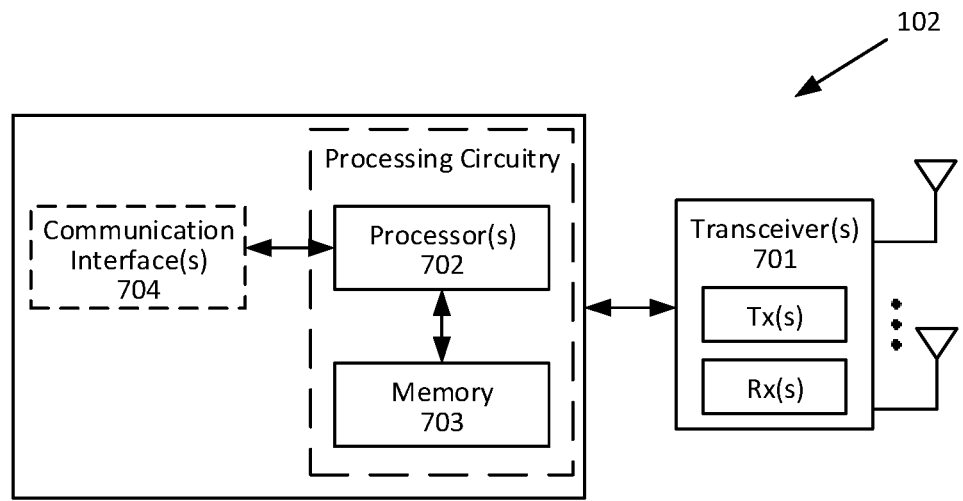
FIG. 7 is a block diagram of an example wireless device.

FIG. 7 is a block diagram of an example wireless device, UE 102, in accordance with certain embodiments. UE 102 can include a transceiver 701, processor 702, memory 703, and communication interface 704. In some embodiments, the transceiver 701 facilitates transmitting wireless signals to and receiving wireless signals from radio access node 104 (e.g., via transmitter(s) (Tx), receiver(s) (Rx) and antenna(s)). The processor 702 executes instructions to provide some or all of the functionalities described above as being provided by UE 102, and the memory 703 stores the instructions executed by the processor 702. In some embodiments, the processor 702 and the memory 703 form processing circuitry. The communication interface 704 communicates signals to network components, such as a gateway, switch, router, Internet, Public Switched Telephone Network (PSTN), core network nodes or radio network controllers, etc.

The processor 702 may include any suitable combination of hardware to execute instructions and manipulate data to perform some or all of the described functions of UE 102, such as the functions of UE 102 described above. In some embodiments, the processor 702 may include, for example, one or more computers, one or more central processing units (CPUs), one or more microprocessors, one or more application specific integrated circuits (ASICs), one or more field programmable gate arrays (FPGAs) and/or other logic.

The memory 703 is generally operable to store instructions, such as a computer program, software, an application including one or more of logic, rules, algorithms, code, tables, etc. and/or other instructions capable of being executed by a processor. Examples of memory 703 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 702 of UE 102.

Other embodiments of UE 102 may include additional components beyond those shown in FIG. 7 that may be responsible for providing certain aspects of the UE's functionalities, including any of the functionalities described above and/or any additional functionalities (including any functionality necessary to support the solution described above). As just one example, UE 102 may include input devices and circuits, output devices, and one or more synchronization units or circuits, which may be part of the processor. Input devices include mechanisms for entry of data into UE 102. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
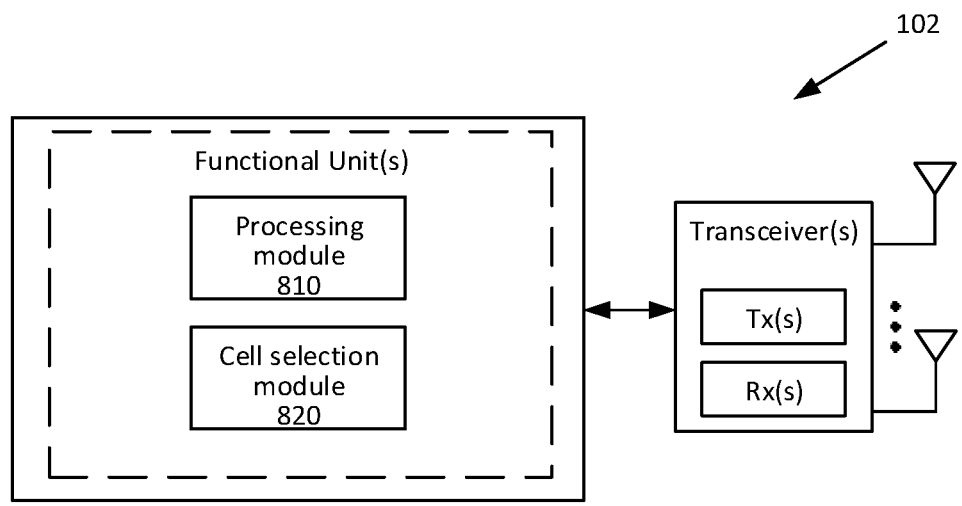
FIG. 8 is a block diagram of an example wireless device with modules.

In some embodiments, the UE 102 can comprise a series of functional units or modules configured to implement the functionalities of the UE described above. Referring to FIG. 8, in some embodiments, the UE 102 can comprise a processing module 810 for processing cell broadcast information including a cell reservation indication and a cell selection module 820 for selecting the cell responsive to determining that a cell reservation exception indication is associated with the wireless device.

It will be appreciated that the various modules may be implemented as combination of hardware and software, for instance, the processor 702, memory 703 and transceiver(s) 701 of UE 102 shown in FIG. 7. Some embodiments may also include additional modules to support additional and/or optional functionalities.

Figure 9:
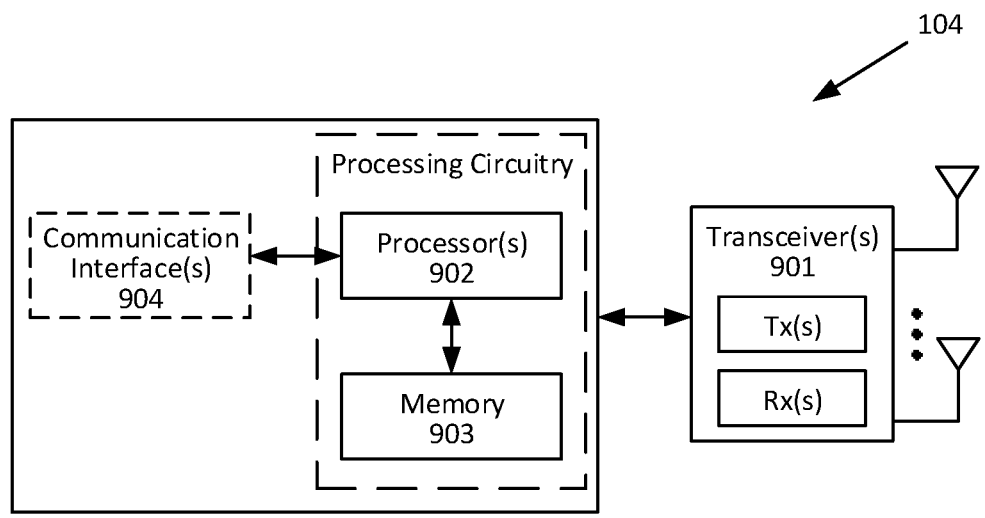
FIG. 9 is a block diagram of an example network node.

FIG. 9 is a block diagram of an exemplary network node 104, in accordance with certain embodiments. Network node 104 may include one or more of a transceiver 901, processor 902, memory 903, and communication interface 904. In some embodiments, the transceiver 901 facilitates transmitting wireless signals to and receiving wireless signals from UE 102 (e.g., via transmitter(s) (Tx), receiver(s) (Rx), and antenna(s)). The processor 902 executes instructions to provide some or all of the functionalities described above as being provided by a network node 104, the memory 903 stores the instructions executed by the processor 902. In some embodiments, the processor 902 and the memory 903 form processing circuitry. The network interface 904 communicates signals to backend network components, such as a gateway, switch, router, Internet, Public Switched Telephone Network (PSTN), core network nodes or radio network controllers, etc.

The processor 902 may include any suitable combination of hardware to execute instructions and manipulate data to perform some or all of the described functions of network node 104, such as those described above. In some embodiments, the processor 902 may include, for example, one or more computers, one or more central processing units (CPUs), one or more microprocessors, one or more application specific integrated circuits (ASICs), one or more field programmable gate arrays (FPGAs) and/or other logic.

The memory 903 is generally operable to store instructions, such as a computer program, software, an application including one or more of logic, rules, algorithms, code, tables, etc. and/or other instructions capable of being executed by a processor. Examples of memory 903 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the communication interface 904 is communicatively coupled to the processor 902 and may refer to any suitable device operable to receive input for network node 104, send output from network node 104, perform suitable processing of the input or output or both, communicate to other devices, or any combination of the preceding. The communication interface 904 may include appropriate hardware (e.g., port, modem, network interface card, etc.) and software, including protocol conversion and data processing capabilities, to communicate through a network.

Other embodiments of network node 104 may include additional components beyond those shown in FIG. 9 that may be responsible for providing certain aspects of the network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Figure 10:
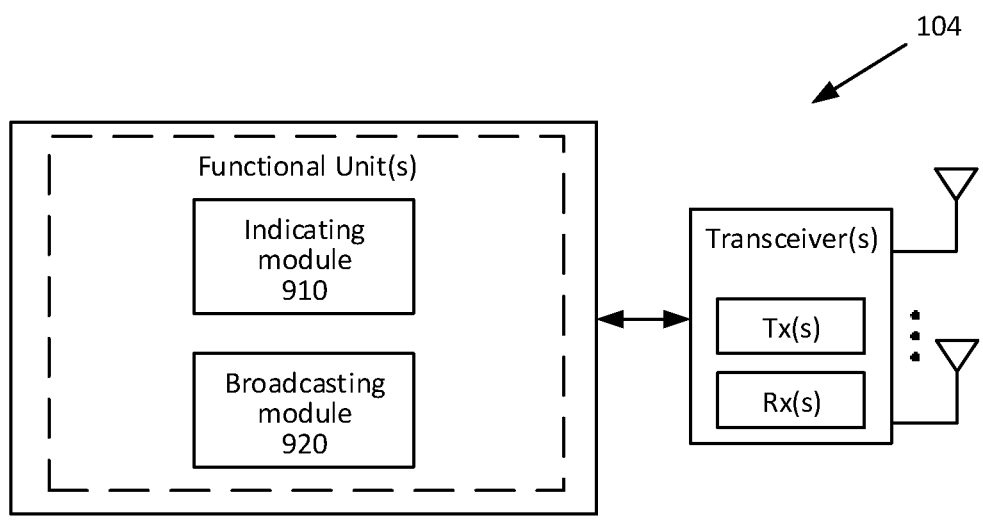
FIG. 10 is a block diagram of an example network node with modules.

In some embodiments, the network node 104, which can be, for example, a radio access node, may comprise a series of modules configured to implement the functionalities of the network node 104 described above. Referring to FIG. 10, in some embodiments, the network node 104 can an indicating module 910 for setting a cell reservation indication and a cell reservation exception indication and a broadcasting module 920 for transmitting broadcast information including the cell reservation indication and the cell reservation exception indication.

It will be appreciated that the various modules may be implemented as combination of hardware and software, for instance, the processor 902, memory 903 and transceiver(s) 901 of network node 120 shown in FIG. 9. Some embodiments may also include additional modules to support additional and/or optional functionalities.

Processors, interfaces, and memory similar to those described with respect to FIGS. 7 and 9 may be included in other network nodes (such as core network node 106). Other network nodes may optionally include or not include a wireless interface (such as the transceiver described in FIGS. 7 and 9).

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:
1×RTT CDMA2000 1× Radio Transmission Technology
3GPP Third Generation Partnership Project
ABS Almost Blank Subframe
ACK Acknowledgement
ADC Analog-to-digital conversion
AGC Automatic gain control
AN Access Network
ANR Automatic neighbor relations
AP Access point
ARQ Automatic Repeat Request
AS Access Stratum
AWGN Additive White Gaussian Noise band
BCCH Broadcast Control Channel
BCH Broadcast Channel
BLER Block error rate
BS Base Station
BSC Base station controller
BTS Base transceiver station
CA Carrier Aggregation
CC Component carrier
CCCH SDU Common Control Channel SDU
CDMA Code Division Multiplexing Access
CG Cell group
CGI Cell Global Identifier
CP Cyclic Prefix
CPICH Ec/No CPICH Received energy per chip divided by the power density in the
CPICH Common Pilot Channel
CQI Channel Quality information
C-RNTI Cell RNTI
CRS Cell-specific Reference Signal
CSG Closed subscriber group
CSI Channel State Information
DAS Distributed antenna system
DC Dual connectivity
DCCH Dedicated Control Channel
DCI Downlink Control Information
DFT Discrete Fourier Transform
DL Downlink
DL-SCH Downlink shared channel
DMRS Demodulation Reference Signal
DRX Discontinuous Reception
DTCH Dedicated Traffic Channel
DTX Discontinuous Transmission
DUT Device Under Test
EARFCN Evolved absolute radio frequency channel number
ECCE Enhanced Control Channel Element
ECGI Evolved CGI
E-CID Enhanced Cell-ID (positioning method)
eMBB Enhanced Mobile Broadband
eNB E-UTRAN NodeB or evolved NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
FDD Frequency Division Duplex
FDM Frequency Division Multiplexing
FFT Fast Fourier transform
GERAN GSM EDGE Radio Access Network
GSM Global System for Mobile communication
HARQ Hybrid Automatic Repeat Request
HD-FDD Half duplex FDD
HO Handover
HRPD High Rate Packet Data
HSPA High Speed Packet Access
LCMS Level of Criticality of the Mobility State
LPP LTE Positioning Protocol
LTE Long-Term Evolution
M2M Machine to Machine
MAC Medium Access Control
MBMS Multimedia Broadcast Multicast Services
MBSFN ABS MBSFN Almost Blank Subframe MBSFN Multimedia Broadcast multicast service Single Frequency Network
MCG Master cell group
MDT Minimization of Drive Tests
MeNB Master eNode B
MIB Master Information Block
MME Mobility Management Entity
MPDCCH MTC Physical Downlink Control Channel
MRTD Maximum Receive Timing Difference
MSC Mobile Switching Center
MSR Multi-standard Radio
MTC Machine Type Communication
NACK Negative acknowledgement
NAS Non-Access Stratum
NDI Next Data Indicator
NPBCH Narrowband Physical Broadcast Channel
NPDCCH Narrowband Physical Downlink Control Channel
NR New Radio
O&M Operation and Maintenance
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
PBCH Physical Broadcast Channel
PCC Primary Component Carrier
P-CCPCH Primary Common Control Physical Channel
PCell Primary Cell
PCFICH Physical Control Format Indicator Channel
PCG Primary Cell Group
PCH Paging Channel
PCI Physical Cell Identity
PDCCH Physical Downlink Control Channel
PDSCH Physical Downlink Shared Channel
PDU Protocol Data Unit
PGW Packet Gateway
PHICH Physical HARQ indication channel
PLMN Public Land Mobile Network
PMI Precoder Matrix Indicator
PRACH Physical Random Access Channel
ProSe Proximity Service
PRS Positioning Reference Signal
PSC Primary serving cell
PSCell Primary SCell
PSS Primary Synchronization Signal
PSSS Primary Sidelink Synchronization Signal
PUCCH Physical Uplink Control Channel
PUSCH Physical Uplink Shared Channel
QAM Quadrature Amplitude Modulation
RACH Random Access Channel
RAT Radio Access Technology
RB Resource Block
RF Radio Frequency
RLM Radio Link Management
RNC Radio Network Controller
RNTI Radio Network Temporary Identifier
RRC Radio Resource Control
RRH Remote Radio Head
RRM Radio Resource Management
RRU Remote Radio Unit
RSCP Received Signal Code Power
RSRP Reference Signal Received Power
RSRQ Reference Signal Received Quality
RSSI Received Signal Strength Indicator
RSTD Reference Signal Time Difference
SCC Secondary Component Carrier
SCell Secondary Cell
SCG Secondary Cell Group
SCH Synchronization Channel
SDU Service Data Unit
SeNB Secondary eNodeB
SFN System Frame Number
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
SSS Secondary synchronization signal
SSSS Secondary Sidelink Synchronization Signal
TA Timing Advance
TAG Timing Advance Group
TDD Time Division Duplex
TDM Time Division Multiplexing
TTI Transmission Time Interval
Tx Transmitter
UARFCN UMTS Absolute Radio Frequency Channel Number
UE User Equipment
UL Uplink
UMTS Universal Mobile Telecommunication System
URLLC Ultra-Reliable Low Latency Communication
UTRA Universal Terrestrial Radio Access
UTRAN Universal Terrestrial Radio Access Network
V2I Vehicle-to-Infrastructure
V2P Vehicle-to-Pedestrian
V2X Vehicle-to-X
WCDMA Wide CDMA
WLAN Wireless Local Area Network

The invention claimed is:

1. A method for cell selection performed by a wireless device, the method comprising:
receiving broadcast information associated with a cell including a cell reservation indication, wherein the cell reservation indication indicates that the broadcast information includes at least one cell reservation exception indication;
responsive to determining that the cell is reserved in accordance with the cell reservation indication, determining that the broadcast information further includes a cell reservation exception indication; and
selecting the cell in accordance with determining that the cell reservation exception indication is associated with the wireless device.

2. The method of claim 1, wherein the cell reservation indication indicates that the cell is barred for selection by wireless devices.

3. The method of claim 1, wherein the cell reservation indication indicates that the cell is reserved for at least one of operator use and other use.

4. The method of claim 1, wherein the cell reservation exception indication defines at least one exception for which the cell is not barred for selection by wireless devices.

5. The method of claim 1, wherein the cell reservation exception indication defines an available service level for the cell.

6. The method of claim 5, further comprising, selecting the cell in accordance with the available service level.

7. The method of claim 1, wherein the cell reservation exception indication defines at least one wireless device identity that is allowed to select the cell.

8. The method of claim 1, wherein the cell reservation exception indication defines at least one closed subscribed group (CSG) that is allowed to select the cell.

9. The method of claim 1, wherein the cell reservation exception indication identifies a network slice.

10. The method of claim 9, further comprising, accessing the identified network slice.

11. A wireless device comprising circuitry including a processor and a memory, the memory containing instructions executable by the processor whereby the wireless device is operative to:
receive broadcast information associated with a cell including a cell reservation indication, wherein the cell reservation indication indicates that the broadcast information includes at least one cell reservation exception indication;
responsive to determining that the cell is reserved in accordance with the cell reservation indication, determine that the broadcast information further includes a cell reservation exception indication; and
select the cell in accordance with determining that the cell reservation exception indication is associated with the wireless device.

12. The wireless device of claim 11, wherein the cell reservation indication indicates that the cell is barred for selection by wireless devices.

13. The wireless device of claim 11, wherein the cell reservation indication indicates that the cell is reserved for at least one of operator use and other use.

14. The wireless device of claim 11, wherein the cell reservation exception indication defines at least one exception for which the cell is not barred for selection by wireless devices.

15. The wireless device of claim 11, wherein the cell reservation exception indication defines an available service level for the cell.

16. The wireless device of claim 15, further operative to select the cell in accordance with the available service level.

17. The wireless device of claim 11, wherein the cell reservation exception indication defines at least one wireless device identity that is allowed to select the cell.

18. The wireless device of claim 11, wherein the cell reservation exception indication defines at least one closed subscribed group (CSG) that is allowed to select the cell.

19. The wireless device of claim 11, wherein the cell reservation exception indication identifies a network slice.

20. The wireless device of claim 19, further operative to access the identified network slice.

21. A method for cell reservation performed by a network node, the method comprising:
setting a value of a cell reservation indication to indicate that a cell is barred for selection;
responsive to determining an exception to the cell reservation, setting a value of a cell reservation exception indication to define at least one exception for which the cell is not barred for selection; and
transmitting broadcast information associated with the cell, the broadcast information including the cell reservation indication and the cell reservation exception indication, wherein the cell reservation indication further indicates that the broadcast information includes at least one cell reservation exception indication.

22. The method of claim 21, wherein the cell reservation indication indicates that the cell is reserved for at least one of operator use and other use.

23. The method of claim 21, wherein the cell reservation exception indication defines at least one wireless device identity that is allowed to select the cell.

24. The method of claim 21, wherein the cell reservation exception indication defines at least one closed subscribed group (CSG) that is allowed to select the cell.

25. The method of claim 21, wherein the cell reservation exception indication indicates an available service level for the cell.

26. The method of claim 21, wherein the cell reservation exception indication identifies a network slice available for selection.

27. A network node comprising circuitry including a processor and a memory, the memory containing instructions executable by the processor whereby the network node is operative to:
set a value of a cell reservation indication to indicate that a cell is barred for selection;
responsive to determining an exception to the cell reservation, set a value of a cell reservation exception indication to define at least one exception for which the cell is not barred for selection; and
transmit broadcast information associated with the cell, the broadcast information including the cell reservation indication and the cell reservation exception indication, wherein the cell reservation indication further indicates that the broadcast information includes at least one cell reservation exception indication.

28. The network node of claim 27, wherein the cell reservation indication indicates that the cell is reserved for at least one of operator use and other use.

29. The network node of claim 27, wherein the cell reservation exception indication defines at least one wireless device identity that is allowed to select the cell.

30. The network node of claim 27, wherein the cell reservation exception indication defines at least one closed subscribed group (CSG) that is allowed to select the cell.

31. The network node of claim 27, wherein the cell reservation exception indication indicates an available service level for the cell.

32. The network node of claim 27, wherein the cell reservation exception indication identifies a network slice available for selection.

* * * * *